United States Patent

Lund et al.

[11] 3,904,882
[45] Sept. 9, 1975

[54] RADIATION TREATMENT METHOD AND APPARATUS FOR DECONTAMINATION OF POLLUTED FLUID

[75] Inventors: Norman Lund, Melbourne; Karol J. Bialy, Merritt Island; Leland A. Mann; Dr. David D. Woodbridge, both of Eau Gallie, all of Fla.

[73] Assignee: Energy Systems, Inc., New York, N.Y.

[22] Filed: May 11, 1970

[21] Appl. No.: 37,398

Related U.S. Application Data

[63] Continuation of Ser. No. 690,475, Dec. 14, 1967, abandoned.

[52] U.S. Cl. .................. 250/437; 210/64; 250/432
[51] Int. Cl.² ........................................ G01N 21/26
[58] Field of Search............. 250/43.5 R, 44, 45, 46, 250/48, 52, 106; 210/64 X

[56] References Cited
UNITED STATES PATENTS

| | | | |
|---|---|---|---|
| 2,901,114 | 8/1959 | Smith et al. | 210/15 |
| 2,938,630 | 5/1960 | Novak | 210/15 |
| 3,079,498 | 2/1963 | Ruffin | 250/45 |
| 3,197,640 | 7/1965 | Speas | 250/44 |
| 3,360,646 | 12/1967 | Rieback et al. | 250/44 |

OTHER PUBLICATIONS

Dunn, C., Treatment of Water and Sewage by Ionizing Radiation from Sewage and Industrial Wastes; Vol. 25, No. 11, Nov. 1953, pp. 1277–1281.

*Primary Examiner*—Archie R. Borchelt
*Attorney, Agent, or Firm*—Duckworth, Hobby & Allen

[57] ABSTRACT

A radiation treatment method and apparatus for the safe disinfection and decontamination of liquid waste, such as sewage. Liquid waste is processed by removing some solids from the effluent, irradiating the effluent less some solids, with a gamma radiation field and percolating the disinfected effluent, or discharging the disinfected liquid into sewage conduits or into streams or other bodies of water. The disinfecting chamber is a box constructed of concrete or other compatible material, having a radiation shielding cover, and having an inlet at one end and an exit at the other end. Baffles located in the box produce desired distribution and turbulence of flow. Sources of ionizing radiation, usually gamma radiation, are placed in the chamber in such a manner as to provide a relatively uniform radiation field in the effluent passing through the system.

3 Claims, 3 Drawing Figures

RADIATION TREATMENT METHOD AND APPARATUS FOR DECONTAMINATION OF POLLUTED FLUID

This is a continuation of application Ser. No. 690,475 filed Dec. 14, 1967, now abandoned.

BACKGROUND OF THE INVENTION

1. Field of the Invention

The present invention relates to waste disposal systems and more specifically to liquid waste disposal systems in which sewage effluent, or the like, is disinfected subsequent to removal of solids but prior to distribution to a percolating system or into a sewage conduit or into a fresh or saline stream or body of water.

Human of domestic wastes from private residences, institutional and commercial buildings, as well as entire communities require disposal systems which must dispose of the waste in a safe manner so as not to contaminate drinking water supplies, or to pollute or contaminate the water of a bathing area, shellfish breeding ground, or stream or body of water used for public or domestic water supply purposes or for recreational purposes. It is also desirable to avoid access to these waste products by insects, rodents or other possible carriers which may come into contact with food or drinking water and to avoid a system that produces offensive odors or unsightly appearances. For these and other reasons, communities that have expanded beyond city limits or are beyond reach of city or other sewer lines have been subjected to laws and regulations governing water pollution and sewage disposal. These regulations, among other things, frequently govern the minimum size property for private and public sewage disposal systems, such as requiring one acre lots for private residences using private disposal systems. These regulations, while necessary under present disposal systems, result in poor utilization of land, an increase in the cost for land developers and purchasers of homes, increasing contamination of natural resources.

The present invention is designed to provide a safer waste disposal method and apparatus, which results in reducing the amount of property required for the safe disposal of liquid waste products. In many present private sewage systems, the liquid content of a building disposal system is discharged into a septic tank which is designed for removing the larger solids from the effluent. These solids are trapped as either sludge which accumulates at the bottom of the tank or scum which is a floating mat of solids on the surface of the fluid. The septic tank traps and stores the solids during decomposition by bacterial and natural processes prior to eventual removal. The effluent with the larger solids removed is discharged from the septic tank into a leaching system where it may be absorbed into the soil. Leaching may be accomplished by a soil-absorption field, which generally has several lines of subsurface drain tiles with open joints placed under the surface of the ground and surrounded by gravel, broken bricks, or the like, so that the septic tank effluent may seep into the surrounding soil. Leaching may also be accomplished by means of a seepage pit, which is a covered pit with open-jointed lining through which the septic tank effluent may seep or leach into surrounding porous soil. For every absorption field system or for seepage pit systems using more than one seepage pit, a distribution box is required to insure equal distribution of effluent to each line or to each seepage pit to prevent overloading and failure of one line or pit while the others are empty. Grease traps are sometimes added to the system to prevent premature failures of the septic tank systems from accumulation of grease.

Percolation through sand or the soil or the like removes disease-producing bacteria which in time tend to die out in the unfavorable environment afforded thereby. This results in eventual purification of sewage effluent. However, if the system is located near a water supply or near a source of water supply used for drinking, growing shellfish, or for swimming, the effluent reaching such areas may not have been filtered or percolated sufficiently by the soil to decrease bacteria to a safe level, thus some of the remaining bacteria may still be capable of producing disease. Accordingly, it is desirable to disinfect the sewage effluent that might reach such sources.

According to our invention, we provide a method of disposing of liquid sewage by first removing some of the solids, if present, by using a septic tank, or the like, then disinfecting the effluent discharged from the septic tank or other holding system by exposing the effluent to sources of ionizing radiation, such as gamma radiation. The disinfected effluent is distributed to a percolating or filtering system for leaching or percolating into sand, soil or the like. The disinfecting process is performed in a chamber with a cover adapted to include shielding against ionizing radiation. An inlet provides entrance of polluted fluid into the chamber while an outlet allows it to pass on to an absorption field or the like. Inside the chamber, a first baffling means produces a controlled flow pattern and turbulence in the effluent. Gamma radiation sources are located in positions relative to each other whereby the effluent is required to pass through a generally desirable and approximately uniform radiation field between the radiation sources. A second baffling means creates turbulent distributed flow prior to the effluent passing out the outlet.

The present invention advantageously provides for a waste disposal process that is safe to surrounding water supplies, while greatly reducing water and ground pollution. It permits more efficient utilization of land in areas where communities sewer systems are not available, by providing a safe disposal system that may be used on smaller parcels of land without danger of increased pollution. Our method and apparatus additionally provides a relatively low cost system which requires minimal maintenance over a relatively long period of time. In addition our system is capable of improving the performance of presently overloaded sewage systems and of increasing their capacities. Other advantages of the present invention include the decomposition of detergents in the waste by generation of ozone which attacks the detergents, and the precipitation of undesirable components of the waste such as iron.

2. Description of the Prior Art

In the past, sewage and other waste disposal systems did not normally have disinfecting means other than that provided by the percolation of the sewage effluent through the soil as already described. It has been suggested in the past that disinfecting chemicals be used in the sewage effluent to protect nearby sources of drinking water or open water used for swimming or growing shellfish. The disinfectant most commonly prescribed is chlorine either as a compressed gas or as a compound such as sodium or calcium hypochlorites. These systems are utilized for municipal or other larger disposal systems but are not normally employed in smaller systems because of the cost of installing them, the cost and danger of handling the disinfectant chemicals, and frequent maintenance of an expensive apparatus for feeding the chlorine or compounds to the sewage effluent.

Radiation treatment of materials other than sewage have been proposed or employed in the past. These radiation processes have used various types of radiation for the processing of foods, drugs and the like. Some of the types of radiation considered are x-ray, infra-red, ultraviolet, or the like.

BRIEF DESCRIPTION OF THE PREFERRED EMBODIMENT

Other objects, features and advantages of this invention will be apparent from a study of the written description and the drawings in which.

DETAILED DESCRIPTION

Figure 1:
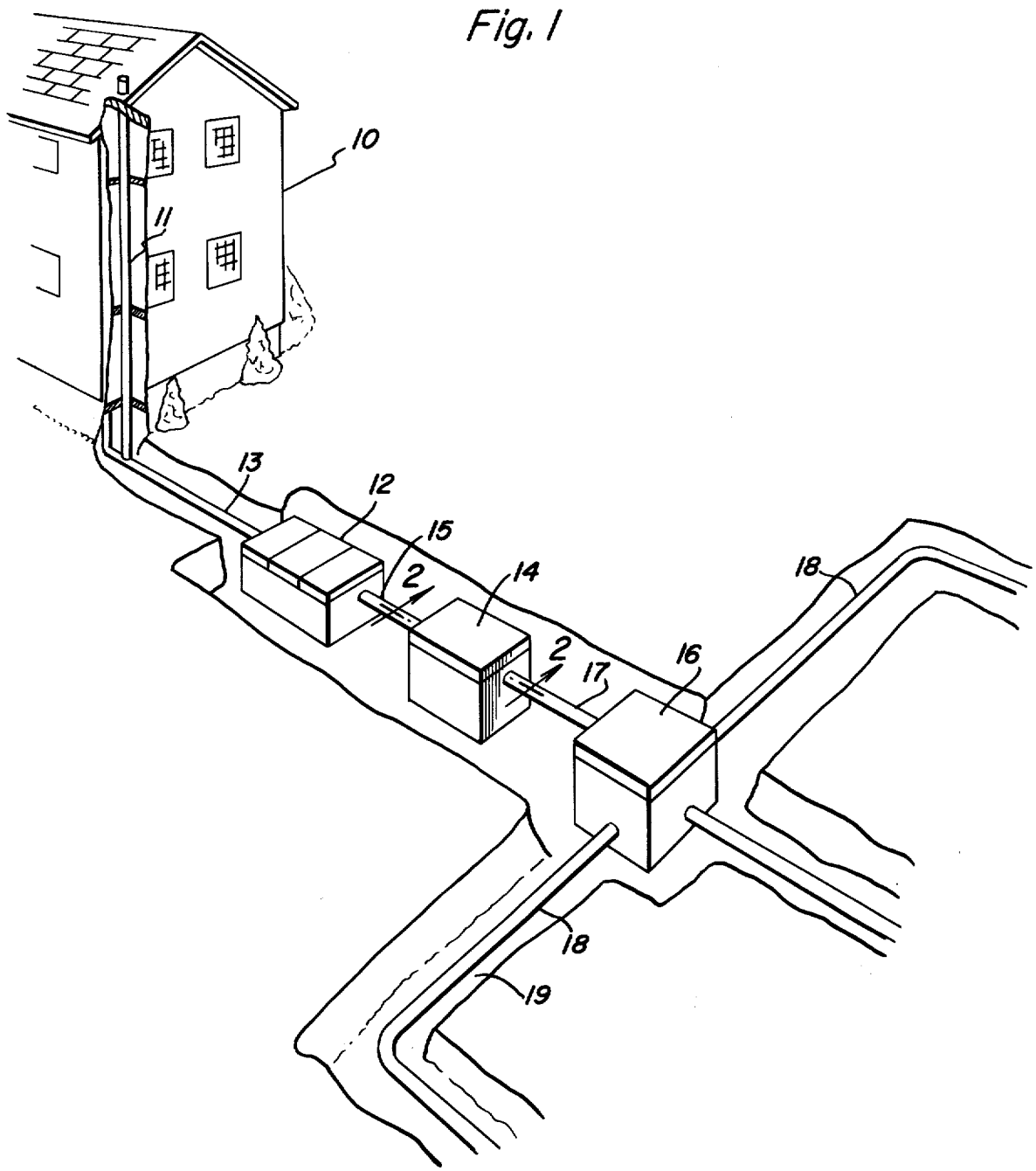
FIG. 1 illustrates the layout of a typical system in accordance with the present invention.

In FIG. 1 an illustration of one typical overall sewage disposal system can be viewed with a building 10 having a cutaway portion to show the stack 11 from which plumbing fixtures are connected. The stack 11 feeds into a septic tank 12 through a pipe 13. Septic tank 12 may be of any design and should be watertight and constructed of materials not subject to excessive corrosion or decay, such as concrete, coated metal, heavyweight concrete blocks, or the like. The septic tank 12 removes solids from the liquid waste by allowing the heavier solids to settle on the bottom as sludge and by trapping the floating scum to prevent these materials from clogging the absorption fields of the system. The septic tank provides a place for the biological treatment of the solids but these tanks must be cleaned periodically to prevent clogging.

The septic tank 12 supplies the liquid sewage effluent with the larger solids removed therefrom to a decontamination chamber 14 through pipe 15. Chamber 14 decontaminates the sewage effluent prior to its being distributed to an absorption field or the like and is described in more detail in connection with FIGS. 2 and 3.

The decontamination (radiation treatment) chamber 14 supplies the disinfected effluent to a distribution box 16 through pipe 17. The distribution box 16 insures equal distribution of the effluent to the several lines 18 of the absorption field. While distribution box 16 is considered essential for every absorption field system, it should be understood that other systems for directing the effluent to a percolating system could be utilized without departing from the spirit and scope of the invention. For instance, a leaching system in which a single seepage pit was used would not require a distribution box, also, the decontamination chamber could be made as an integral part of the distribution box. Pipes 15 and 17 are equipped with fittings and outlets not shown in FIG. 1, to allow easier flushing and other cleaning and maintenance of chamber 14.

The effluent is distributed by the distribution box 16 into pipe lines 18 of the absorption field which may be a subsurface pipe system using approved drain tiles, such as 4 × 12 inch clay tile, or the like, laid in such a manner that the flow from distribution box 16 will be distributed with reasonable uniformity into the soil. A percolating system could have trenches filled on all sides with gravel 19 which gravel 19 could also be broken brick, washed rock or similar aggregate.

Figure 2:
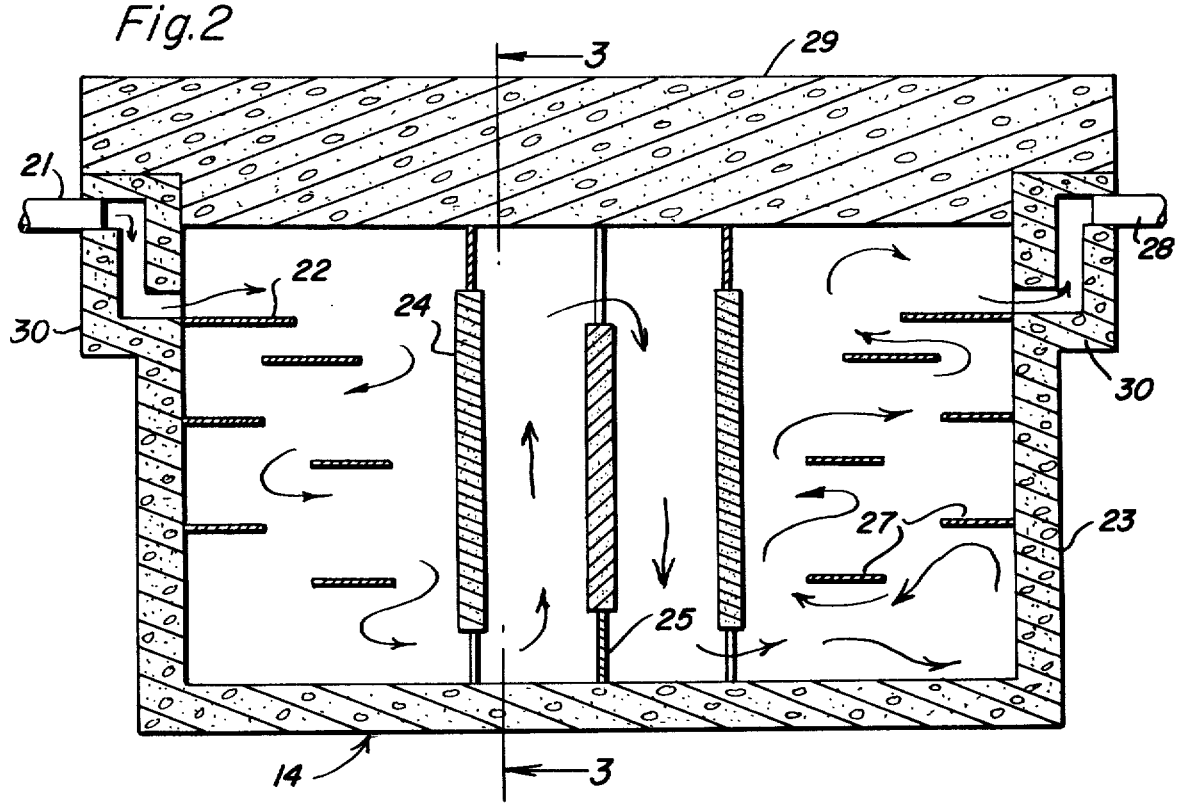
FIG. 2 shows a cutaway side view of the decontamination chamber taken along lines 2—2 of FIG. 1.
Figure 3:
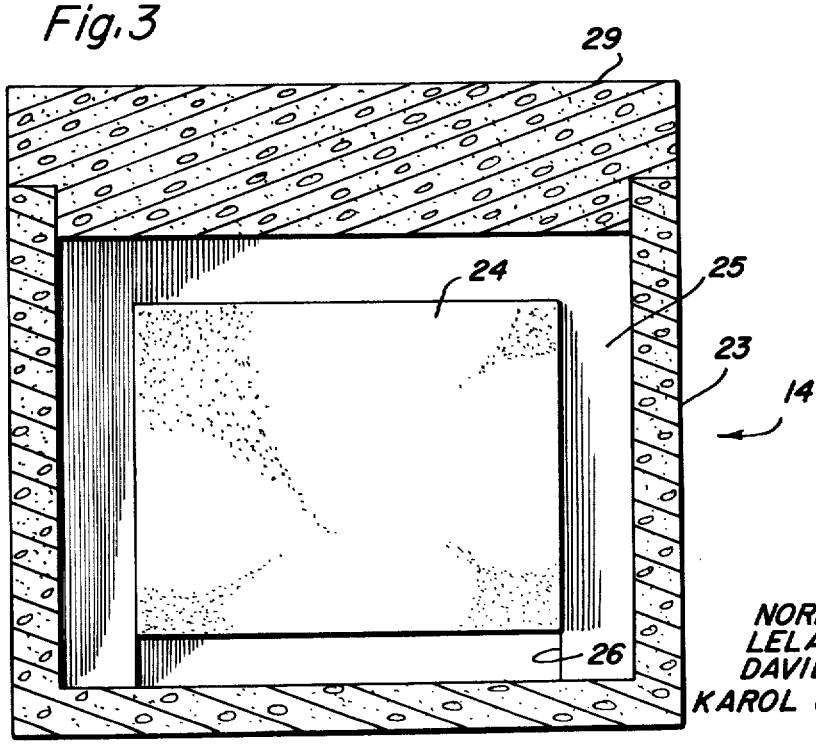
FIG. 3 shows a cutaway end view of the decontamination chamber taken along lines 3—3 of FIG. 2.

Turning now to FIGS. 2 and 3, there is shown two cutaway views of the decontamination chamber 14 which chamber has an entrance pipe 21 leading into the chamber and has entrance baffles 22 illustrated as being located in a horizontal position but which may also be located vertically or in other positions and are fitted to the walls 23 of chamber 14. These baffle plates cause a desirable flow pattern and turbulence in the flow of the effluent entering from entrance 21. Walls 23 will normally be made of concrete or other compatible material, which is corrosion resistant, and provides adequate protection from radiation hazards. Walls 23 are not restricted to homogenous material construction but may be laminated or adapted for insertion of a separate interior tank. Chamber 14 also shows sources of gamma radiation 24 placed parallel to each other. These sources 24 may for example be ⅛ – ¼ inch plates of cobalt 60 or cesium 137, but are not limited to this configuration. Cobalt 60 is a desirable source because of its availability and reasonable price, and cesium 137 because of its greater life. However, other approved sources of ionizing radiation may also be used without departing from the scope and spirit of the invention. Plates 24 may be framed or held in place on three sides by plates 25 which will also be of a corrosion resistant material such as stainless steel or reinforced concrete and may be 8 inches from source 24 to the walls. The effluent is forced to travel through openings 26 and between the plates 24 which may be ½ inches to 6 inches apart depending upon the sources but not necessarily limited to these dimensions. Between the plates 25 there is a substantially uniform field of radiation which results in a correspondingly uniform kill of bacteria and other microbiological life and with a substantial purification of the effluent passing through the chamber. The flow of the effluent is indicated generally by arrows in FIG. 2.

After the effluent leaves the last opening 26 it passes through exit baffles 27 which may be located either horizontally as shown or vertically and should be made of a corrosion resistant material such as stainless steel or reinforced concrete. These baffles cause additional turbulence and a desirable pattern in the flow of the effluent prior to leaving the disinfecting chamber 14 through exit pipe 28. Chamber 14 has a top 29 which is made of a material such as lead or concrete and which will protect persons above or in the vicinity of the chamber from the source of radiation. For example, concrete 30 inches thick might be used for protection from gamma radiation sources of cobalt 60.

The walls 23 do not need the same thickness as the cover, since they are surrounded by the soil which provides protection from radiation hazards.

Referring now to FIGS. 1–3, it can be seen that sewage or other liquid waste passing through pipe 13 enters the tank 12 where the larger solids are removed. The effluent then passes through pipe 15 and into decontamination chamber 14 where it is disinfected by approximately uniform fields of gamma radiation.

The effluent enters the chamber 14 through entrance 21 passing through baffles 22, between gamma radiation sources 24, through baffles 27 and out exit 28. The disinfected effluent then flows through pipe 17 into distribution box 16 where it is distributed into a percolating system having pipes 18 and gravel 19 for percolation through gravel 19 and into the surrounding soil.

An apparatus and method for the safe disposal of sewage and other liquid waste has been disclosed but it should be understood that other embodiments are contemplated as being within the spirit of the present invention. For instance, the system might be provided with a separate or internal grease trap to prevent grease from clogging up the system prematurely, and while a single building has been illustrated, it will be clear to those skilled in the art that the present method and apparatus could serve many buildings or could serve larger buildings such as apartments or motels, as well as other liquid waste such as industrial plant waste. Also, different shapes and configurations of the radiation sources than those illustrated may be used. It is emphasized that the same conceptual method is intended for application to effluents from sewage gathering and/or treatment facilities of unlimited magnitude. Larger flow rates would be accomodated by a system or systems with larger and/or more numerous radiation sources, with appropriate adaptions and modifications of design, appurtenances, and materials.

The invention is not to be construed as limited to the particular forms, capacities, sizes, and materials disclosed herein, since these are to be regarded as illustrative rather than restrictive.

We claim:

1. A radiation chamber for use in a liquid waste effluent treatment system comprising in combination:
   radiation shielding chamber means having two ends and a removable gamma radiation shielding cover, said chamber being adapted to prevent the passage of gamma radiation from said container; said chamber means having an inlet in one end and an outlet in the other end thereof adapted to prevent the exit of gamma radiation from said chamber; inlet baffle means adapted to increase the turbulence and to direct effluent toward a gamma radiation source; a plurality of parallel spaced gamma radiation sources adapted for said effluent to pass between and to provide substantially uniform radiation fields therebetween; outlet baffle means for baffling said effluent passing through said gamma radiation sources for directing said effluent toward a gamma radiation source, whereby effluent passing through said chamber will be substantially uniformly irradiated.

2. The apparatus in accordance with claim 1 in which said gamma radiation sources are parallel plates of cobalt 60.

3. The apparatus in accordance with claim 1 in which said gamma radiation sources are parallel plates of cesium 137.

* * * * *